May 19, 1942.   W. S. BRUBAKER ET AL   2,283,532
THERMALLY ADJUSTABLE METER
Filed April 1, 1940   3 Sheets-Sheet 1
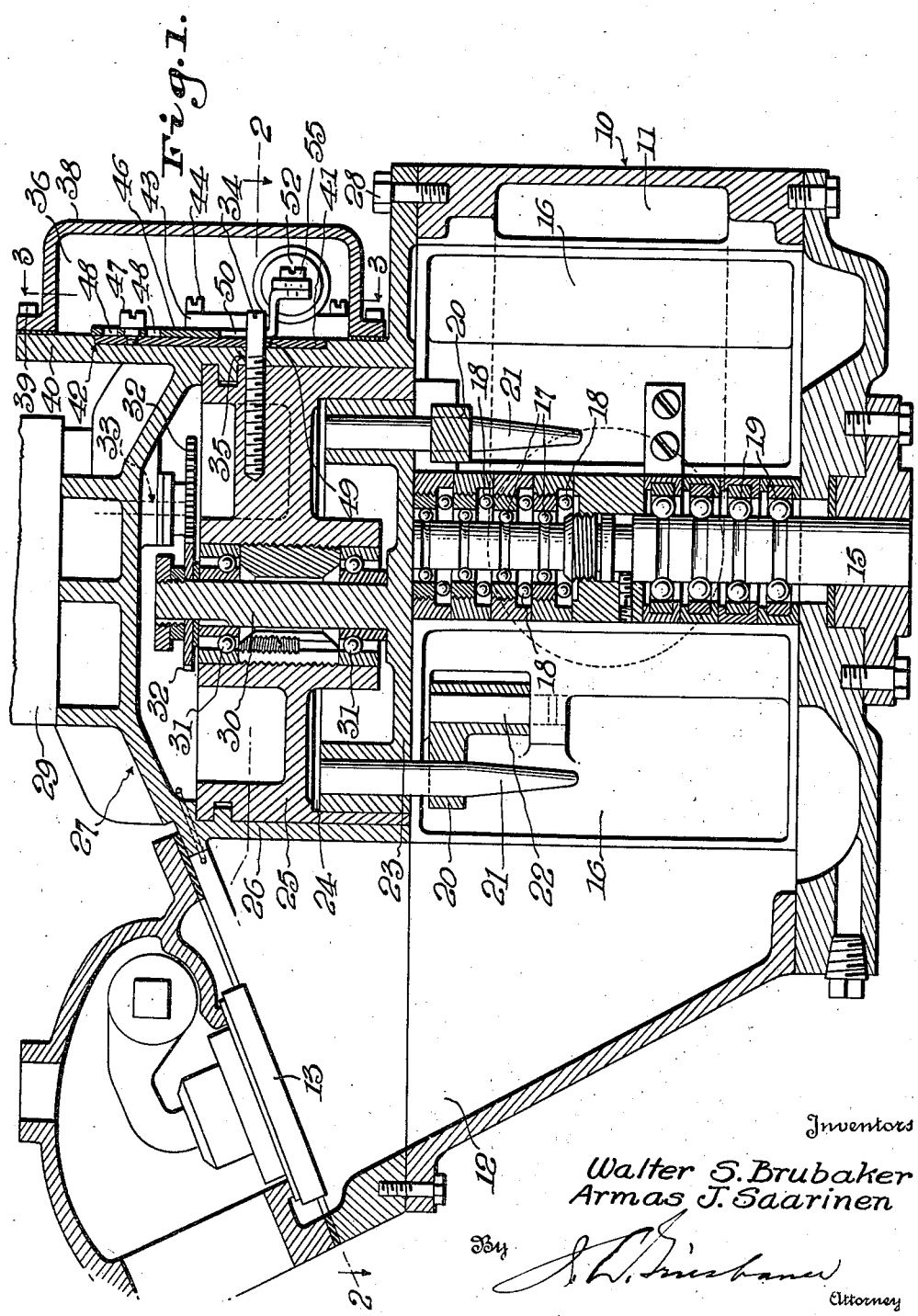
Inventors
Walter S. Brubaker
Armas J. Saarinen
By
Attorney

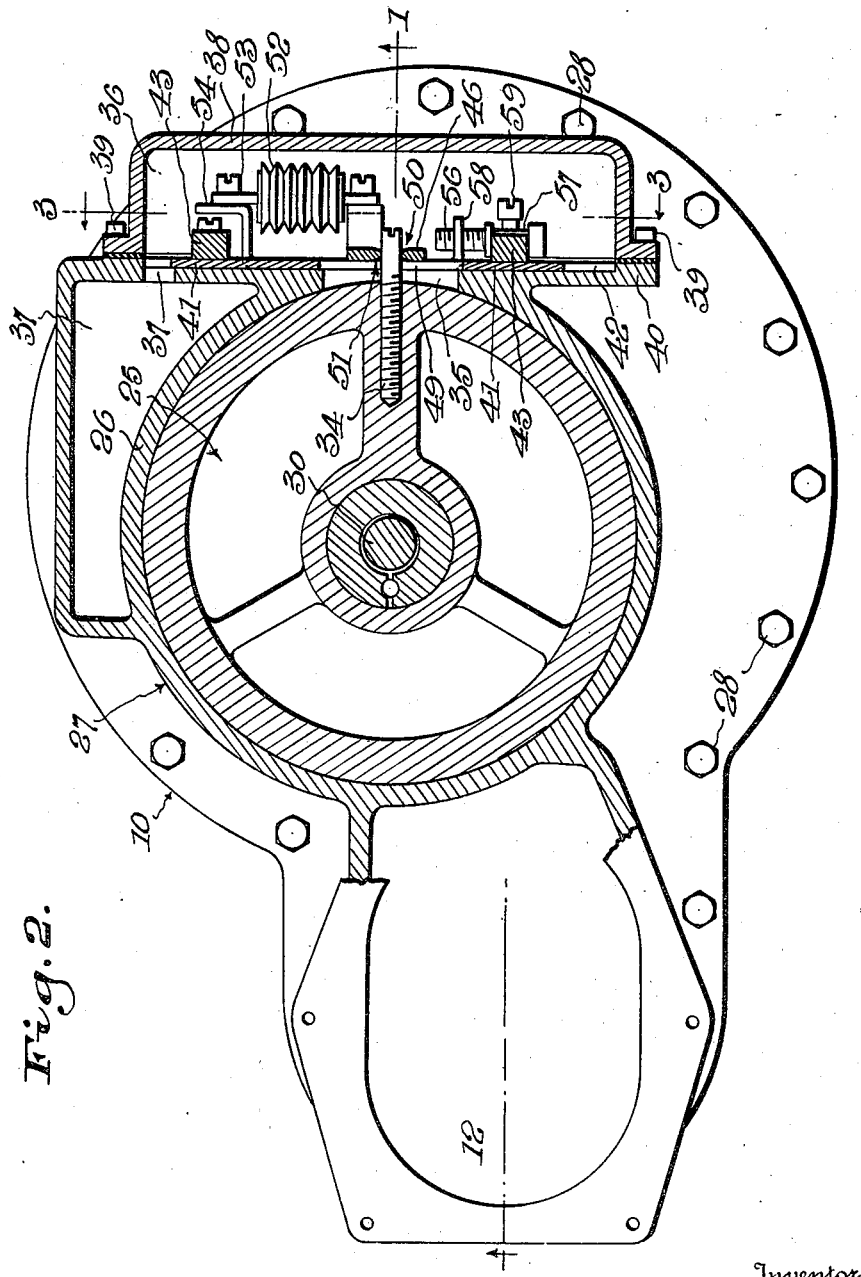

May 19, 1942.  W. S. BRUBAKER ET AL  2,283,532
THERMALLY ADJUSTABLE METER
Filed April 1, 1940  3 Sheets-Sheet 3
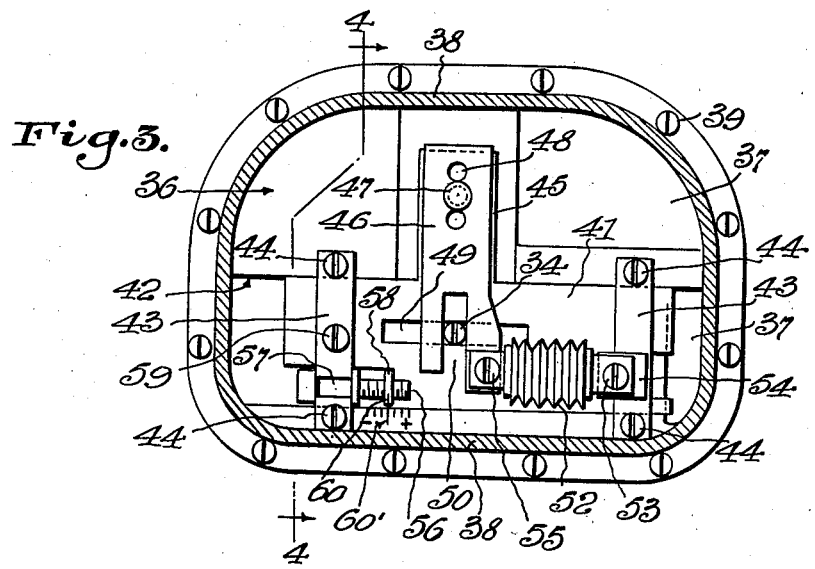
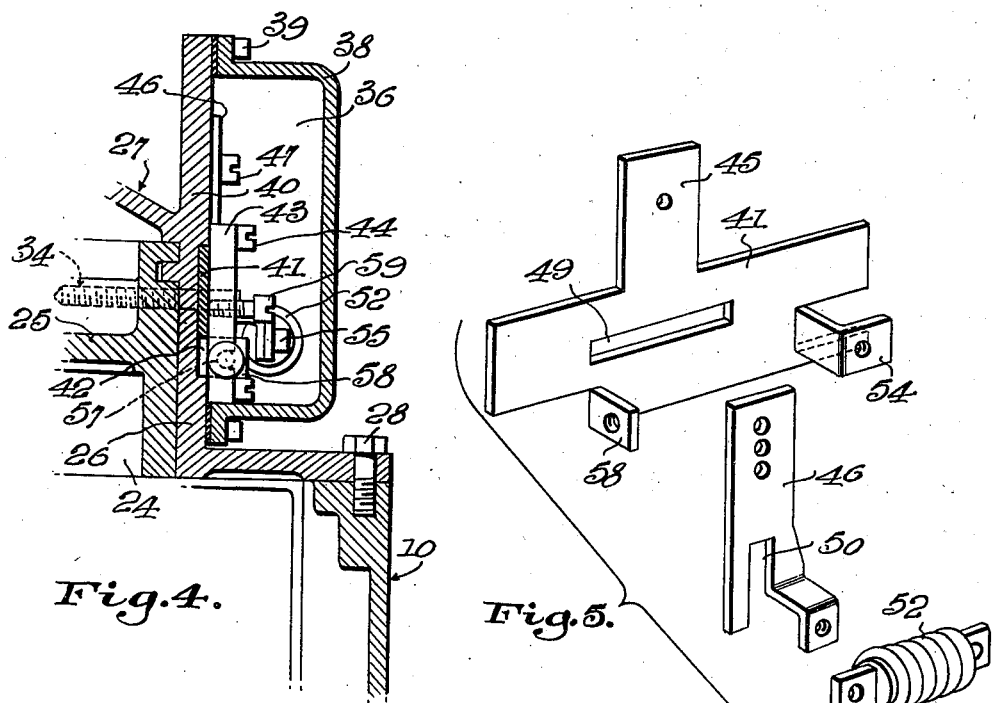
Inventors
Walter S. Brubaker
Armas J. Saarinen Patented May 19, 1942

2,283,532

UNITED STATES PATENT OFFICE 2,283,532

THERMALLY ADJUSTABLE METER

Walter S. Brubaker, Oakland, and Armas J. Saarinen, San Francisco, Calif., assignors, by mesne assignments, to S. F. Bowser & Company, Incorporated, Fort Wayne, Ind., a corporation of Indiana Application April 1, 1940, Serial No. 327,298

6 Claims. (Cl. 73—253)

The invention relates to fluid meters used primarily for measuring petroleum products and other liquids, the volumes of which vary considerably with temperature changes.

One object of the invention is to so improve upon the rotary type of meter shown in U. S. Patent to Saarinen No. 2,131,236 of September 27, 1938 and U. S. Patent to Siebecker and Saarinen No. 2,197,322 of April 16, 1940, as to automatically adjust the same according to the temperature of the meter-handled liquid, in a manner insuring that the meter shall discharge the proper mass of liquid regardless of the volume to which said mass may be thermally expanded.

The rotary meter above mentioned and other types of meter include an adjustable element, adjustment of which serves to vary the meter discharge. To this adjustable element, we operatively connected thermostatically actuated adjusting means subjected to the meter-handled liquid, and we thus provide for automatic adjustment of said adjustable element according to the temperature of the meter-handled liquid to attain the desired results, and a further object is to make novel provision whereby initial setting of said adjustable element to set the meter for accurate delivery of liquid, at a predetermined temperature, may be effected by positionally adjusting said thermostatically actuated adjusting means.

A still further object is to provide novel manually adjustable means whereby the extent of adjustment imparted to said adjustable element by any predetermined extent of thermostat expansion or contraction, in other words, the ratio of thermostat movement to element adjustment, may be varied, permitting adaptation of the meter to the handling of fluids having different coefficients of thermal expansion.

Yet another object is to provide a simple and inexpensive, yet a durable and trouble-free mechanism for attaining the desired end.

With the foregoing in view, the invention resides in the novel subject matter hereinafter described and claimed, description being accomplished by reference to the accompanying drawings.

Figure 1 is a vertical sectional view through a rotary meter of the above mentioned type, embodying the present invention, the view being cut substantially on line 1—1 of Fig. 2.

Figure 2 is a horizontal sectional view on line 2—2 of Fig. 1.

Figure 3 is an enlarged vertical sectional view on line 3—3 of Figs. 1 and 2.

Figure 4 is a detail vertical sectional view on line 4—4 of Fig. 3.

Figure 5 is a disassembled perspective view showing the thermostatically actuated adjusting means and the carrier upon which same is mounted.

In the drawings above briefly described, a substantially cylindrical casing 10 is shown having a fluid inlet 11 and an outlet 12, a faucet valve 13 being shown associated with said outlet. A central shaft 15 rises rigidly from the casing bottom and pivotally carries a plurality of radial vanes 16, suitable bearings for which are denoted at 17, 18 and 19. These vanes 16 are operatively connected in any suitable way, for example, by links 20 and pins 21, 22, with a register-driving disk 23, the axis of said disk being eccentric to the axis of the shaft 15 to cause relative opening and closing movements of the vanes 16 as the meter operates, the spaces between said vanes constituting measuring chambers. The disk 23 is shown rotatably mounted in a recess 24 in a rotatively adjustable head 25 which constitutes the "adjustable element" hereinbefore mentioned, in the present disclosure. The head 25 is rotatably mounted in an upstanding neck portion 26 of a cover 27 which is secured by cap screws or the like 28 upon the casing 10, and said cover carries a suitable register 29. The disk 23 is provided with a central register-driving shaft 30 mounted in suitable bearings 31 carried by the head 25, said shaft 30 being operatively connected by appropriate gearing 32 with the register shaft 33 which operates the register 29.

As in the patents above referred to, showing the general structure so far described, the vanes 16 relatively open and receive fluid from the inlet 11, and relatively close and discharge the fluid into the outlet 12, and the disk 23 drives the register 29 to register the fluid passed through the meter. The maximum angle existing between adjacent vanes during operation of the meter and the minimum angle existing between them, may be respectively increased and decreased, or vice versa, by varying the eccentricity of the disk axis with respect to the vane axis, and this adjustment (plus or minus as required) is effected by rotatively adjusting the head 25, within which the disk 23 is eccentrically mounted. In the patents above referred to, rotative adjustment of the head has been effected to attain agreement between meter discharge and register reading, and this same result is attainable in the improved meter when initially setting same to accurately deliver and register fluid at a predetermined (preferably low) temperature. Rotative adjustment of the head 25 is also automatically effected by thermastatically actuated adjusting means to vary the meter discharge in accordance with the temperature and consequent expanded condition of the fluid being handled, whereby the meter will discharge the proper mass of fluid regardless of the extent to which it may be thermally expanded.

For connecting the thermostatically actuated adjusting means with the head 25, we have shown a pin 34 secured to and projecting outwardly from said head, said pin extending through a slot 35 in the casing neck 26. The outer end of this pin is received in a chamber 36 which receives some of the fluid being handled by the meter. In the present showing, we have disclosed appropriate passage means, various portions of which are indicated at 37 for placing the chamber 36 in communication with the intake side of the meter. This chamber 36 is preferably formed to a large extent by a cap or housing 38 secured by cap screws or the like 39 to a portion of the casing neck 26, said neck portion being preferably in the form of a vertical wall 40.

Within the chamber 36, we have shown a slidable carrier 41 which is guided by a shallow groove 42 in the wall 40, said carrier being retained in said groove by suitable cross bars 43 secured to the wall 40 by screws or the like 44. The carrier 41 is provided with an upstanding projection 45 to which a vertical lever 46 is fulcrumed at 47, the fulcrum being preferably in the form of a shouldered screw which may be passed through any of a series of openings 48 in said lever 46 and threaded into the carrier projection 45, permitting adjustment of said lever 46 for a purpose to appear. In the present showing, the carrier 41 is formed with a slot 49 registering with the slot 35 above described, and the lever 46 is formed with a slot 50, said slots 49 and 50 receiving the pin 34 so that movement of lever 46 will move said pin to rotatively adjust the head 25 as may be required. The longitudinal edges of the slot 50 are preferably beveled on both sides of the lever 46 as shown at 51 to permit the necessary relative angling of the lever and pin 34 during adjustment of the latter by means of the former.

A thermostat 52 which is preferably in the form of a Sylphon bellows, is mounted on the carrier 41 and operatively connected with the lever 46. The Sylphon bellows, of course, contains a liquid having an appropriate coefficient of expansion and after the meter is initially set to accurately deliver at one predetermined temperature, this liquid will expand and contract as required, causing the thermostat 52 to operate lever 46, thus moving pin 34 to rotatively adjust the head 25 which varies the discharge of the meter as above explained. It is preferable that one end of the thermostat 52 be connected by a screw 53 to an angular lug 54 on the carrier 41, and that the other end of said thermostat be connected by a screw 55 to the lever 46.

A manually adjustable screw 56 has been shown swivelled as at 57 in a notch in one of the cross bars 43 and threaded through a lug 58 on the carrier 41. By turning the screw 56 in the proper direction, the carrier 41 may be adjusted longitudinally of its guideway 42, thus causing the thermostatically actuated head adjusting means mounted on said carrier to turn the head 25 in one direction or the other, permitting initial adjustment of the meter for accurate delivery of fluid at a predetermined temperature. After adjustment, the carrier may be locked in any suitable way, for example, by means of a locking screw 59 threaded through one of the cross bars 43.

It is preferable that the lug 58 be provided with an indicator 60 cooperable with a scale 60' to aid in effecting any desired plus or minus adjustment.

After proper initial setting of the meter, it will operate to discharge the proper mass of fluid regardless of the extent to which such fluid may be expanded. The thermostat 52 is subjected to the meter-handled fluid due to location within the chamber 36 and said thermostat, therefore, expands with increased temperature of the fluid and contracts with decreased temperature, the thermally effected movements of said thermostat being transmitted to the head 25 through the instrumentality of the lever 46 and pin 34, causing said head 25 to vary the meter discharge as required, according to the temperature and consequent expanded condition of the fluid. By adjusting the lever 46 by means of the fulcrum screw 47 and openings 48, we are enabled to vary the movement which any predetermined expansion or contraction of the thermostat 52 will impart to the head 25. In other words, by making the adjustment in question, we are enabled to vary the ratio of thermostat movement to head movement and can thus adapt the meter to the handling of fluids having different coefficients of expansion. This overcomes the necessity of providing a special thermostat for each fluid to be handled.

We have rather specifically described our improvements in order that a thorough understanding may be obtained, but we wish it understood that the present disclosure is illustrative rather than limiting, it being possible to make numerous variations within the scope of the invention as claimed.

We claim:

1. In a liquid meter comprising displacement means and a register, means for varying the relation between the volume of the liquid discharged by the displacement means and the volume registered by said register, a thermostat having portions movable relatively to each other in accordance with the change in temperature, means for subjecting said thermostat to the temperature of the liquid being measured, an adjustable support for said thermostat, means connecting the thermostat to actuate said volume relation varying means, said connecting means comprising a selectively adjustable motion modifying mechanism, and means for transmitting the movement of said support to said volume relation varying means.

2. In a liquid meter comprising displacement means and a register, means for varying the relation between the volume of the liquid discharged by the displacement means and the volume registered by said register, a thermostat having portions movable relatively to each other in accordance with the change in temperature, means for subjecting said thermostat to the temperature of the liquid being measured, an adjustable support for said thermostat, means connecting the thermostat to actuate said volume relation varying means, said connecting means comprising a selectively adjustable motion modifying mechanism, means for mounting said motion modifying mechanism on said support, and means including said motion modifying mechanism for transmitting the adjustment of said support to said volume relation varying means.

3. In a liquid meter comprising displacement means and a register, means for varying the relation between the volume of the liquid discharged by the displacement means and the volume registered by said register, a thermostat having portions movable relatively to each other in accordance with the change in temperature, means for subjecting said thermostat to the temperature of the liquid being measured, an adjustable support for said thermostat, means for adjusting said support and for retaining it in adjusted position, selectively adjustable motion modifying mechanism mounted on said support and connecting said thermostat to said volume relation varying means for modifying the motion of the former and transmitting the modified motion to the latter, and means including said motion modifying mechanism for transmitting the adjusting motion of said support to said volume relation varying means to effect calibration of the meter.

4. In a meter having a casing provided with an inlet and an outlet, relatively movable fluid-driven vanes rotatable about a common axis in said casing, a rotary disk eccentric to said axis, means operatively connecting said vanes with said disk to effect relative opening and closing movement of said vanes as the meter operates, and a rotatively adjustable head in said casing carrying said disk for varying the eccentricity of the disk axis with respect to the vane axis to vary the meter discharge by increasing the maximum and decreasing the minimum angles between adjacent vanes or vice versa according to the direction in which said head is turned, a lever operatively connected with said adjustable head for adjusting the same, a thermostat operatively connected with said lever for operating the same to automatically adjust said head in accordance with the temperature of the meter handled fluid, a carrier upon which said lever and thermostat are mounted, said carrier being mounted for adjustment to cause said thermostat and lever to initially adjust said head, means for holding said carrier in adjusted position, adjusting means for said lever whereby the ratio of thermostat movement to head adjustment may be varied to adapt the meter for fluids having different coefficients of thermal expansion.

5. In a liquid meter comprising displacement means and a register, means for varying the relation between the volume of the liquid discharged by the displacement means and the volume registered by said register, a thermostat having portions movable relatively to each other in accordance with the change in temperature, means for subjecting said thermostat to the temperature of the liquid being measured, an adjustable support for said thermostat, a motion modifying mechanism connecting said thermostat with said volume relation varying means, said mechanism including a lever and an adjustable fulcrum for varying the modifying effect, and means for transmitting movement of said support to said volume relation varying means for calibrating the meter.

6. In a liquid meter comprising displacement means and a register, means for varying the relation between the volume of the liquid discharged by the displacement means and the volume registered by said register, a thermostat having portions movable relatively to each other in accordance with the change in temperature, means for subjecting said thermostat to the temperature of the liquid being measured, an adjustable support for said thermostat, a motion modifying mechanism connecting said thermostat with said volume relation varying means, said mechanism including a lever and an adjustable fulcrum for varying the modifying effect, said fulcrum being adjustably mounted on said support, said mechanism being adapted to transmit the adjustment of said support to said volume relation varying means.

WALTER S. BRUBAKER.
ARMAS J. SAARINEN.